June 27, 1961
A. T. DE FINO
2,989,833
POWER RAKE
Filed Jan. 30, 1959
2 Sheets-Sheet 1
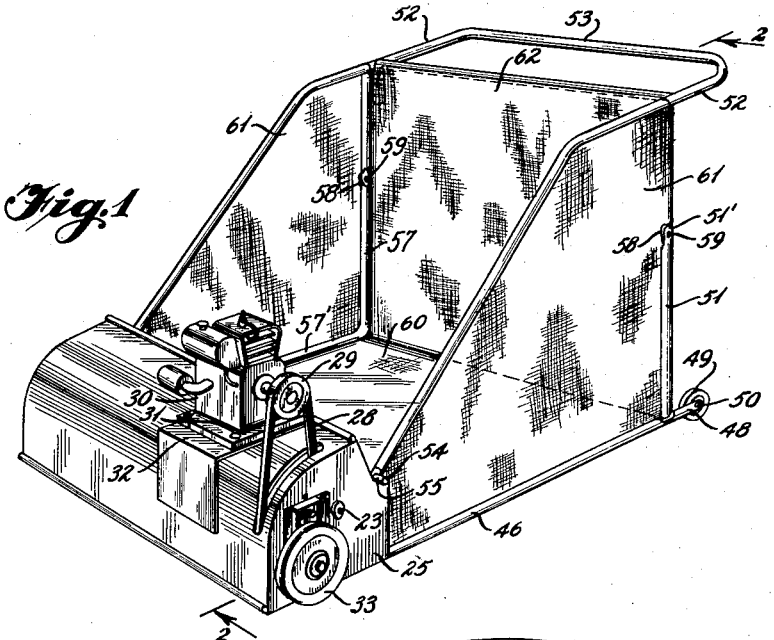
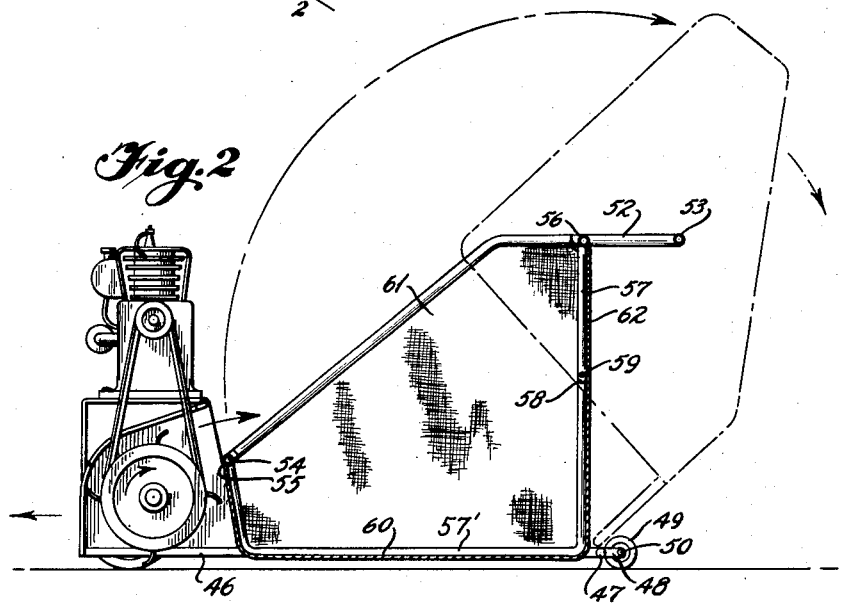
INVENTOR
*Anthony T. Defino*
BY
*A. Yates Dowell*
ATTORNEY June 27, 1961   A. T. DE FINO   2,989,833
POWER RAKE
Filed Jan. 30, 1959                           2 Sheets-Sheet 2
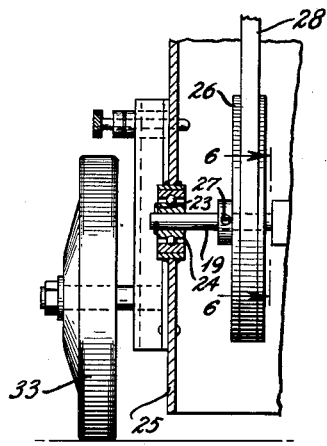
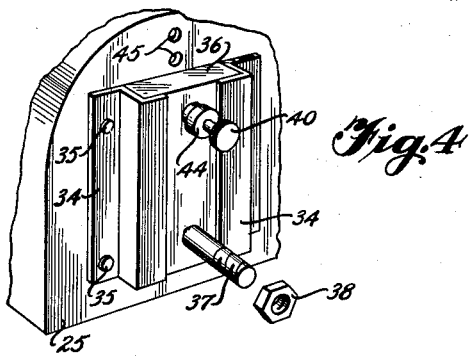
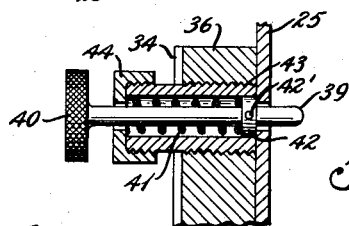
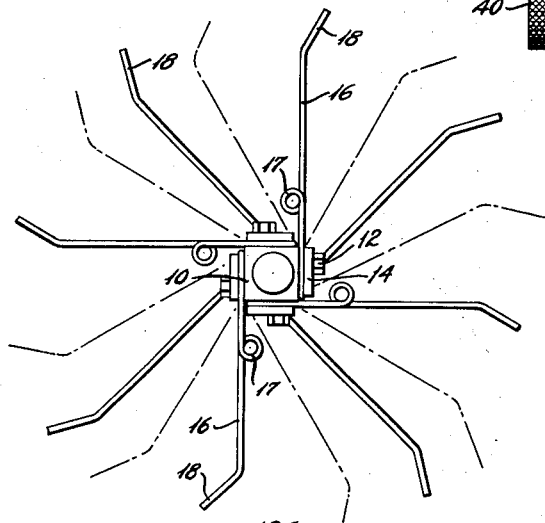
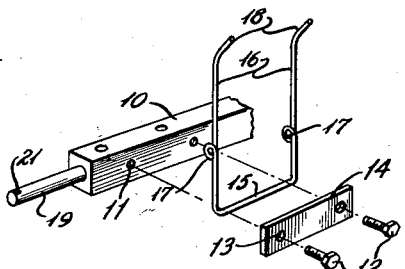
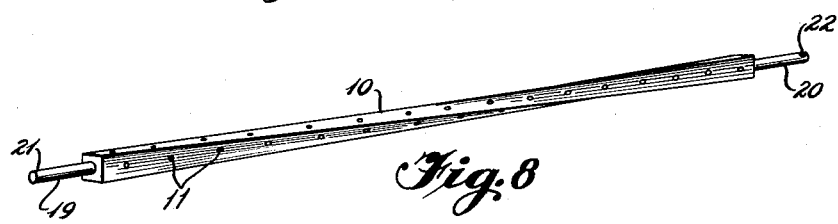
INVENTOR
Anthony T. Defino
BY
A. Yates Dowell
ATTORNEY United States Patent Office 2,989,833
Patented June 27, 1961

2,989,833
POWER RAKE
Anthony T. De Fino, 2712 SW. 12th St.,
Des Moines 15, Iowa
Filed Jan. 30, 1959, Ser. No. 790,082
3 Claims. (Cl. 56—27)

This invention relates to the care and cultivation of the soil including the cutting of grass and other growth on lawns, around dwellings and other structures and to the collection and removal of the cut growth, as well as leaves and trash.

The invention relates particularly to a lawn rake and collection receptacle by means of which leaves and the like may be simply and easily collected, deposited in a container and subsequently removed from a lawn and discarded.

The collection of leaves, grass and other growth in yards, on lawns and the like presents a problem, and attempts to solve it have not been completely successful. Devices employed have been cumbersome, heavy, difficult to use, failed to satisfactorily clean the yard or lawn, were expensive and objectionable for other reasons.

It is an object of the invention to overcome the difficulties enumerated and to provide a simple, inexpensive, power-operated lawn rake and receptacle for the collection of the material raked such as leaves, grass and trash as well as a lawn rake of lightweight construction with portions which can be readily replaced and in addition a receptacle from which the collected material can readily be dumped or discharged after being filled.

Other objects and advantages of the invention will be apparent from the following description taken in conjunction with the accompanying drawings, wherein:

FIG. 1 is a perspective illustrating one application of the invention;

FIG. 2, a section on the line 2—2 of FIG. 1;

FIG. 3, an enlarged fragmentary detail illustrating the mounting and vertical adjustment of the rake and its housing;

FIG. 4, a fragmentary perspective of the adjusting and wheel supporting mechanism;

FIG. 5, a fragmentary enlarged detail of the mechanism for locking the parts in adjusted relation;

FIG. 6, a section on the line 6—6 of FIG. 3;

FIG. 7, an enlarged detail of the manner of attachment of the rake teeth to their supporting shaft; and FIG. 8, a perspective of the shaft for the rake teeth.

Briefly stated, the lawn rake of the present invention includes a shaft substantially square in cross-section but twisted slightly to provide a spiral and with threaded openings spaced along the spiral faces of the shaft into which headed fasteners are engaged. Such fasteners bind a plate across the closed end of a U-shape wire member forming two prongs or rake teeth, each of which prongs has a loop therein to increase flexibility. The U-shaped prong forming members are spaced along the shaft and due to the spiral nature of the latter the prongs will be spirally disposed. The rake tooth carrying shaft is supported at its ends in bearings located in the opposite ends of a housing about the rake teeth and such housing is provided at each end with opposed spaced flanges providing a slideway for a bearing block for a stub shaft on which a wheel is mounted at each end of the housing. After the block is adjusted as to height with regard to the end of the housing, it is secured in fixed relation by means of a spring projected pin, the end of which is adapted to be disposed within one of a series of openings in the end of the housing.

With continued reference to the drawings, a shaft 10 is provided which is substantially square in cross-section and twisted so that its four sides are spirally disposed and have a series of threaded openings 11 spaced along the same and adapted to receive threaded fasteners 12 which extend through openings 13 in plates 14 by means of which the connected ends 15 of U-shaped rake prongs are secured to the shaft, each pair of prongs 16 being provided with a loop 17 for increased flexibility. Also, the free ends 18 of the rake prongs are bent forwardly in the direction of rotation to facilitate the lifting of material raked.

Due to the spiral nature of the shaft the rake prongs or teeth will be spirally disposed.

In order to mount the shaft the latter is provided with cylindrical end portions 19 and 20 having openings 21 and 22 for the reception of cotter pins 23. The cylindrical ends of the shaft fit in bearings 24 in the end walls of a housing 25 of a length to fit over the rake teeth and expose them only at the bottom and rear of the housing.

Means is provided for adjusting the height of the housing with the shaft 10 and rake prongs attached thereto. The cylindrical end 19 of the shaft is provided with a pulley 26 secured to the shaft by means of a set screw 27. The pulley 26 is driven by a belt 28 from a pulley 29 driven by an internal combustion engine 30 attached by bolts or other fasteners 31 to a flat platform 32 mounted on top of the casing or housing 25.

The housing 25 is supported by wheels 33 which are adjustably mounted on such housing by means of a pair of opposed flanges 34 attached by rivets or other fasteners 35 to each end of the housing. The flanges provide a guide for a sliding block 36 having a stub shaft 37 on which one of the wheels 33 is carried, the outer end of such shaft is threaded for reception of a retaining nut 38. The sliding block may be secured in adjusted position between the opposed flanges 34 by a spring pressed pin 39 having a knurled head 40. The pin may be retracted against the action of a spring 41 bearing against a collar 42 fixed on the pin 39 by a set screw 42'. The spring 41 and collar 42 are confined within a cylinder 43 threadedly connected at one end to the adjustable block 36 and at the opposite end to a screw cap 44 having an aperture of a size which will permit the pin to pass freely but will confine the spring 41. The end of the pin is adapted to be inserted into one of a series of aligned openings 45 to vary the vertical position of the stub shaft 37 on which a wheel is retained.

Attached to the rear of the housing is a receptacle to collect the leaves, grass and trash picked up by the rake. This receptacle comprises a fixed frame and a movable frame with such movable frame being covered with canvas to provide a container. The fixed frame comprises a substantially horizontal rearwardly extending U-shaped member having legs 46 and a connecting portion 47, such legs being attached to the housing 25 in any desired manner. Projections 48 are secured to the connecting portion 47 at each side adjacent the legs 46 and wheels 49 are rotatably mounted on such projections by pins 50. An upright post 51 is welded or otherwise attached to each of the legs 46 adjacent the connecting portion 47 and is provided with a flattened portion 51' at the upper extremity thereof.

The movable frame likewise comprises a substantially horizontal rearwardly extending U-shaped member having legs 52 and a connecting portion 53. The free ends of the legs 52 are inclined downwardly and are provided with pins 54 which rest in a cradle 55 formed in the rear of the end walls of the housing 25. A cross bar 56 connects the legs 52 in spaced relation to the connecting portion 53 and depending posts 57 are attached to the legs 52 adjacent the cross bar 56. The posts 57 extend downwardly and have forwardly extending portions 57' substantially parallel to the legs 46 of the fixed frame. The forward ends of the portions 57' are inclined upwardly and are attached to the free ends of the legs 52. The depending posts 57 have flattened portions 58 substantially midway thereof to which the flattened portions 51' of the upright posts 51 are pivotally connected by pins 59.

A canvas container is provided which has a bottom 60, sides 61 and a back 62. The sides and back are attached to a portion of the legs 52 and the cross bar 56 and are supported by the depending posts 57 and the forwardly extending portions 57'.

When it is desired to empty the contents from the container, it is necessary merely to depress the connecting portion 53 of the movable frame and pivot such frame about the pivot pin 59 to a position shown in phantom in FIG. 2.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A combination power lawn rake and dump-type leaf receptacle comprising a housing, wheels supporting said housing, rotary rake means mounted in said housing, an engine mounted on said housing, drive means from said engine to said rake means, frame means attached to the rear of said housing, said frame means comprising rearwardly extending elements, each element being connected at one end to said housing and having an upright post at its opposite end, a movable frame extending above said posts, said frame comprising a generally U-shaped member, support means extending downwardly from said U-shaped member and pivotally attached to said upright posts, generally horizontally extending members connecting said support means and the free ends of said U-shaped member, a cover mounted on said movable frame having a bottom, rear and sides providing a container for the reception of the raked material, and a portion of said U-shaped member adapted for dumping the material from said container.

2. The structure of claim 1 having wheels on said rearwardly extending elements.

3. The structure of claim 1 in which said rotary rake means includes a series of flexible prongs attached to a spirally twisted shaft.

References Cited in the file of this patent

UNITED STATES PATENTS

| | | |
|---|---|---|
| 428,371 | Blondeau | May 20, 1890 |
| 666,689 | Phillips | Jan. 29, 1901 |
| 939,765 | Walte | Nov. 9, 1909 |
| 998,544 | Mosher | July 18, 1911 |
| 1,507,317 | Laberge | Sept. 2, 1924 |
| 1,846,507 | Boring | Feb. 23, 1932 |
| 2,505,576 | Reitan | Apr. 25, 1950 |
| 2,508,454 | Goodwin | May 23, 1950 |